June 10, 1958 R. A. WATSON 2,838,341
ROOF CONSTRUCTION FOR VEHICLES
Filed March 27, 1956 2 Sheets-Sheet 1

Richard A. Watson
INVENTOR

BY

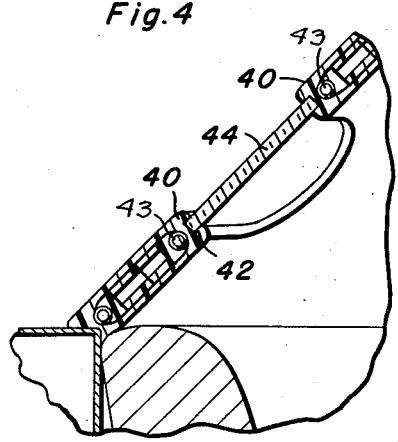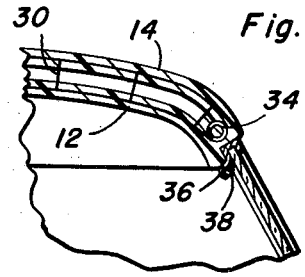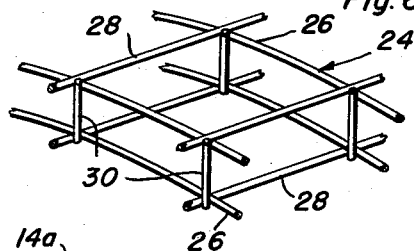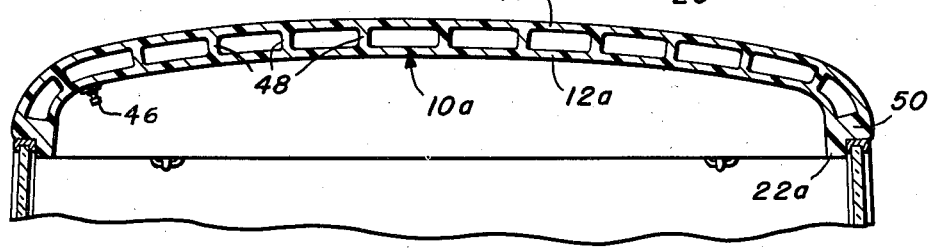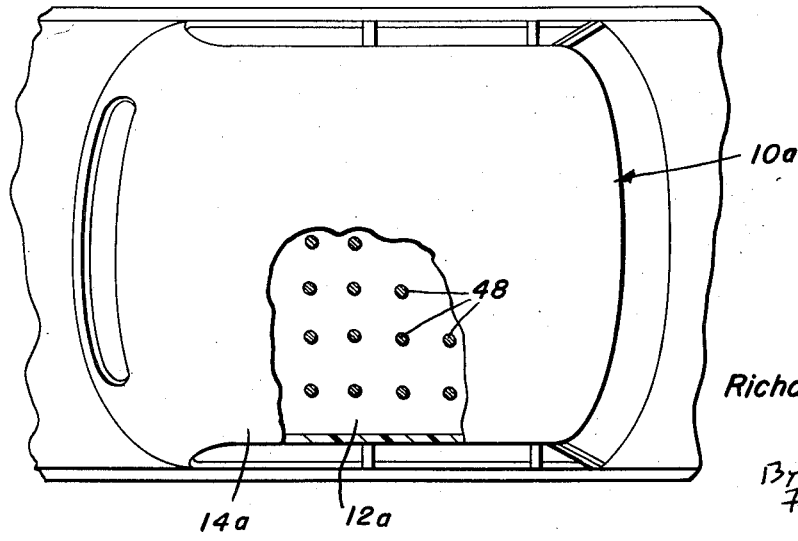

United States Patent Office 2,838,341
Patented June 10, 1958

2,838,341

ROOF CONSTRUCTION FOR VEHICLES

Richard Albert Watson, Kitzbuehel, Austria

Application March 27, 1956, Serial No. 574,294

3 Claims. (Cl. 296—137)

This invention appertains to improvements in roof constructions for vehicles and particularly relates to a novel removable roof or top construction which can be entirely removed as a unit from the body of a vehicle to convert a closed body vehicle into an open top vehicle.

A primary object of this invention is to provide a removable roof or top which can be folded into a compact form for storage in any convenient part of the vehicle and which can be easily unfolded and fixedly secured to the vehicle body to cover the top thereof.

Another important object of this invention is to provide an inflatable flexible roof which has unlimited flexibility when deflated, so as to be foldable into an extremely compact and small form, and which is sturdy and capable of withstanding pressures when inflated and secured in place on the body of a vehicle.

Another important object of this invention is to provide a flexible, inflatable heavy duty roof or top for a vehicle which roof is formed to be positioned on the body of a vehicle in a manner to assure against admission of water and air into the interior of the body.

A further important object of this invention is to provide an inflatable flexible roof which is composed of an inner and outer layer of suitable flexible and sturdy materials such as rubber, plastic, fabric or the like; the layers being joined at their edges to form an air-tight roof and being joined intermediate their edges by flexible connectors that brace the layers and maintain them in proper relationship when the roof is inflated.

The foregoing and ancillary objects, including the provision of a simple, compact and inexpensive roof or top particularly adapted for use on convertible vehicles, are attained by this invention, the preferred forms of which are set forth in the following description and illustrated in the accompanying drawings, wherein:

Fig. 4 is a detailed longitudinal vertical sectional view taken on line 4—4 of Fig. 2;

Fig. 5 is a detailed longitudinal vertical sectional view taken on line 5—5 of Fig. 3;

Fig. 6 is a fragmentary perspective view of the flexible connecting network between the upper or outer and lower or inner layers of the roof;

Fig. 7 is a transverse sectional view of a modified form of roof or top, and

Fig. 8 is a top plan view of the roof of Fig. 7 with a part of the upper or outer layer broken away.

Referring now more particularly to the drawings and initially to Figs. 1 to 6, the numeral 10 generally designates a removable roof or top for a vehicle, particularly though not exclusively, an automobile 8 of the convertible type.

The roof 10 is composed of inner or lower and outer or upper layers 12 and 14 of sturdy flexible material. Suitable materials are rubber, plastic, fabric, nylon and the like materials which are strong and highly flexible for easy folding. The lower and upper layers are identically contoured and shaped, the contour and shape depending upon the body styling, form and size of the vehicle.

Figure 1:
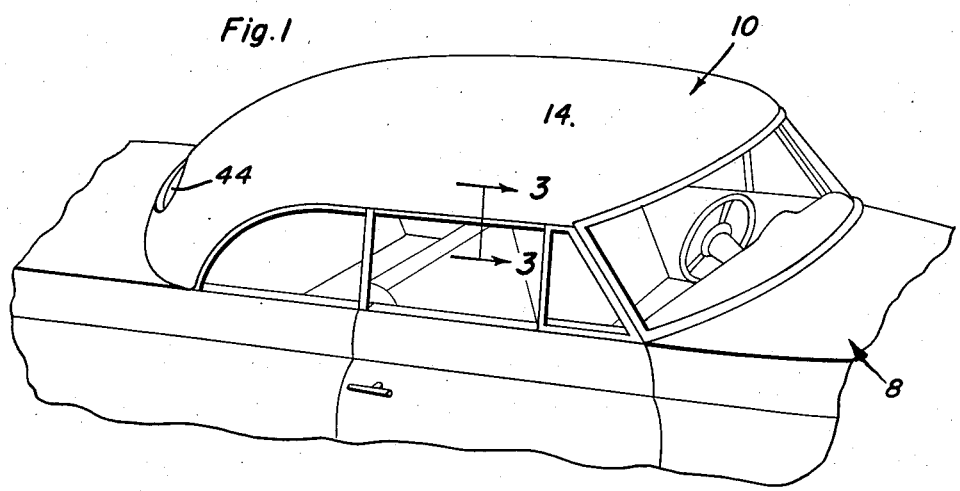
Fig. 1 is a perspective view of the top or roof of this invention, showing the same mounted in position on the body of a vehicle of the convertible type.
Figure 3:
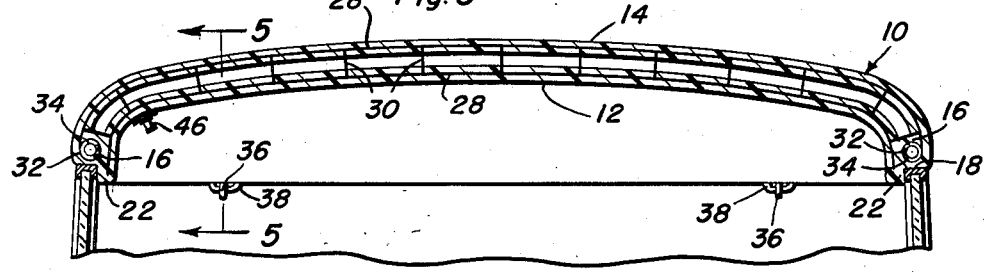
Fig. 3 is a transverse sectional view taken on line 3—3 of Fig. 1.
Figure 2:
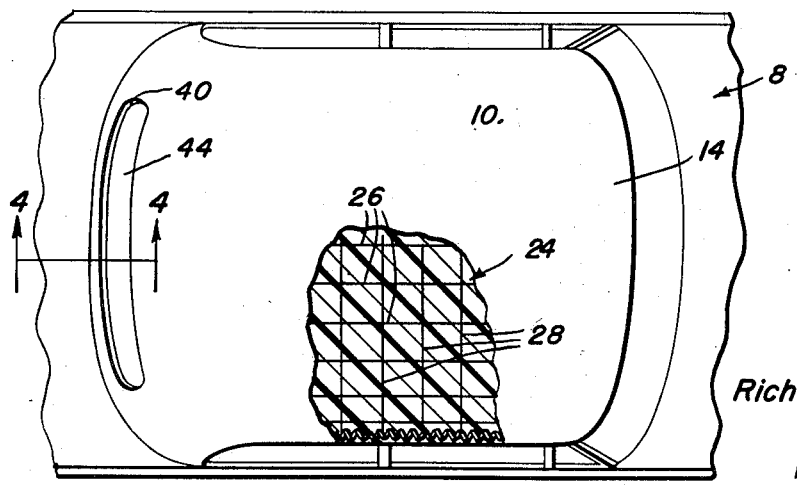
Fig. 2 is a top plan view of the roof with a portion of the upper layer broken away.

The upper and lower layers are joined at their peripheral edges in a manner to space them apart and to form an air-tight seal there-between. For example, as shown in Fig. 3, the edges of the layers are joined by a thick rim or strip 16 which is molded integral with the layers and forms the thick edge of the roof. The rim has a flat underside 18 which rests on the upper edge of the windshield frame or the upper edge of the back wall of the interior of the body and on the side window channels. A lip 22 is integral with the rim and depends from the inner portion of the underside thereof. The lip 22 provides the means for locating the roof or top in place and also provides the means for excluding air and water from the interior when the windows are closed. The air-tight juncture between the edges of the layers can be made by a resilient thick molded strip to which the edges can be joined by bonding or the like process. The strip would, of course, be formed with a depending lip and would form a molded edge.

Suitable strengthening and brace means is provided and includes a network 24 of thin flexible elements, such as wires or cords (nylon, rayon or the like) embedded in each layer. The networks 24 consist of longitudinally extending flexible elements 26 and transverse flexible elements 28 which are suitably connected at their junctures, as shown in Fig. 6. The flexible elements are of a very fine diameter and permit unlimited flexibility of the layers of the roof and the entire roof structure, when deflated. The layers are interconnected, intermediate their edges by flexible elements 30 which, as shown in Fig. 6, are suitably joined to the longitudinal and transverse flexible elements at the junctures thereof.

The rim or molded edge 16 of the layers is formed with a continuous bore 32 which extends completely around the roof and within which a spiraled flexible element 34 is disposed to strengthen the entire structure. The longitudinal and transverse flexible elements 26 and 28 are suitably connected at their ends to the spiral edge element 34.

The lip 22 or some adjoining portion of the rim or edge 16 carries locking elements 36 at spaced points. Such locking elements cooperate with companion locking elements 38 fixed on the body of the vehicle along the upper edge of the windshield frame, back wall and side channels. Any suitable form of locking elements may be used. For example, as shown in Figs. 5 and 7, the locking elements 36 may be hooks that fit in keepers which constitute the locking elements 38. Thus, any suitable form of complementary locking means may be provided to secure the roof on the body of a vehicle.

The rear portions of the layers are formed with coinciding cutouts and the edges of the cutouts are joined by a continuous beading or molded strip 40 which has a channel 42 formed in its outer face to air tightly receive and hold a transparent flexible window 44, which can be made from any suitable plastic material. The edge strip 40 is reinforced with a spiraled flexible element 43 to which the contiguous ends of the longitudinal and transverse elements are attached.

A valve 46 is provided and is preferably fitted in the bottom layer at any desired point.

It can be seen that, due to the flexible nature of the layers and their joining edge and the flexibility of the strengthening networks and connecting and bracing elements, the entire roof structure is highly flexible. The roof can be folded or rolled into a small and compact bundle and stored in the trunk of the vehicle or in any other desired place, since it will occupy a very small amount of space.

To install the roof in place, the roof is unfolded or unrolled and positioned in place, the lip 22 locating the roof in place. The locking elements are then secured together and the roof is inflated to a predetermined air pressure by connecting a source of compressed air to the valve 46. The air pressure will tend to push the roof outward and inward as the layers are moved apart downwardly and upwardly. The greater surface area of the outer or upper layer 14, as compared with the inner or lower layer 12, will gain in overall force of expansion and because of the strengthening networks and connecting elements the upper layer will pull the lower layer upwardly until the layers are in final position.

If desired, the networks 24 can be formed from spiral wires.

In Figs. 7 and 8, a modified form of roof 10a is shown, wherein the lower and upper layers 12a and 14a are molded with integral connectors 48 in the form of thin struts. The edge 50 of the roof 10a is formed with a depending lip 22a. The wire networks and wire reinforcing and connecting elements are obviated since the thick edge 50 alone reinforces and strengthens the body constituting the roof.

While the best known forms of my invention have been disclosed herein, other forms may be realized as coming within the scope of the appended claims.

Having thus described this invention, what is claimed is:

1. A removable top or roof for an open top vehicle comprising an inflatable, flexible body member, said body member including an inner and an outer layer of flexible material, means air-tightly sealing the peripheral edges of the layers together and spacing them apart, valve means carried by one of the layers to inflate and deflate the body member and locking means carried by said first named means for detachably securing the body member on the body of an open top vehicle, a separate reinforcing grid of first thin flexible elements embedded in each of said layers of flexible material and a plurality of spaced second thin flexible elements connecting the grid in one of said layers to the grid in the other of said layers, said grids each comprising a plurality of crossed first flexible members and said second flexible elements interconnecting each of the cross-over points of one of said grids with an adjacent cross-over point of the other of said grids.

2. The combination in accordance with claim 1, wherein said first-named means includes a thick rim sealingly connecting the edges of said layers, a flexible reinforcing element extending through said rim throughout the periphery of said rim, said grids being connected to said flexible reinforcing element.

3. The combination in accordance with claim 2 further comprising a rear window in said top, said window including a transparent flexible material secured in aligned apertures of said layers, a flexible reinforcing element disposed about the periphery of said transparent material, said grids being secured to said latter reinforcing element.

References Cited in the file of this patent

UNITED STATES PATENTS

| | | |
|---|---|---|
| 1,150,811 | Cooke | Aug. 17, 1915 |
| 2,448,054 | Seckel | Aug. 31, 1948 |
| 2,657,716 | Ford | Oct. 28, 1950 |
| 2,747,929 | Masano | May 29, 1956 |